US011398656B2

(12) United States Patent
Zaghib et al.

(10) Patent No.: US 11,398,656 B2
(45) Date of Patent: Jul. 26, 2022

(54) LITHIUM-AIR BATTERY

(75) Inventors: Karim Zaghib, Longueuil (CA); Julie Trottier, Blainville (CA); Abdelbast Guerfi, Brossard (CA)

(73) Assignee: HYDRO-QUEBEC, Montreal (CA)

( * ) Notice: Subject to any disclaimer, the term of this patent is extended or adjusted under 35 U.S.C. 154(b) by 33 days.

(21) Appl. No.: 13/991,269

(22) PCT Filed: Nov. 28, 2011

(86) PCT No.: PCT/CA2011/050737
§ 371 (c)(1),
(2), (4) Date: Sep. 26, 2013

(87) PCT Pub. No.: WO2012/071668
PCT Pub. Date: Jun. 7, 2012

(65) Prior Publication Data
US 2014/0023940 A1 Jan. 23, 2014

(30) Foreign Application Priority Data
Dec. 1, 2010 (CA) .................... CA 2724307

(51) Int. Cl.
H01M 12/08 (2006.01)
H01M 4/40 (2006.01)
H01M 4/134 (2010.01)
H01M 4/1395 (2010.01)
H01M 4/38 (2006.01)
H01M 12/06 (2006.01)
H01M 10/0569 (2010.01)
H01M 4/36 (2006.01)
H01M 4/58 (2010.01)

(52) U.S. Cl.
CPC .......... *H01M 12/08* (2013.01); *H01M 4/134* (2013.01); *H01M 4/1395* (2013.01); *H01M 4/382* (2013.01); *H01M 4/405* (2013.01); *H01M 4/366* (2013.01); *H01M 4/5815* (2013.01); *H01M 10/0569* (2013.01); *H01M 12/06* (2013.01); *Y02E 60/10* (2013.01)

(58) Field of Classification Search
CPC ................................ H01M 4/58; H01M 12/08
See application file for complete search history.

(56) References Cited

U.S. PATENT DOCUMENTS

| | | | |
|---|---|---|---|
| 5,487,959 A | 1/1996 | Koksbang | |
| 5,510,209 A * | 4/1996 | Abraham | H01M 4/381 429/231.95 |
| 7,771,870 B2 | 8/2010 | Affinito et al. | |
| 2004/0081894 A1 | 4/2004 | Nimon et al. | |
| 2004/0209159 A1 | 10/2004 | Lee et al. | |
| 2004/0224195 A1 * | 11/2004 | Huang | H01M 10/42 429/406 |
| 2005/0186469 A1 * | 8/2005 | De Jonghe | C03C 17/245 429/137 |
| 2006/0063051 A1 * | 3/2006 | Jang | H01M 4/36 429/406 |
| 2007/0172739 A1 * | 7/2007 | Visco | H01M 12/04 429/322 |
| 2008/0138700 A1 * | 6/2008 | Horpel | H01M 2/14 429/129 |
| 2008/0286645 A1 * | 11/2008 | Nobuta | H01M 4/60 429/122 |
| 2009/0029263 A1 | 1/2009 | Zaghig et al. | |

(Continued)

FOREIGN PATENT DOCUMENTS

CN 1511351 A 7/2004
CN 101533935 A 9/2009
(Continued)

OTHER PUBLICATIONS

V. EinEli,* S. R.Thomas, and V. R. Koch, "New Electrolyte System for Li-Ion Battery", J. Electrochem. Soc., vol. 143, No. 9, Sep. 1996 The Electrochemical Society, Inc.*
Nebesny et.al ("Reactions of Clean Lithium Surfaces with SO-2: Molecular Auger Line-Shape Analysis and Reaction Kinetics") (Year: 1984).*
Hooper et al.; "Novel siloxane polymers as polymer electrolytes for high energy density lithium batteries"; Silicon Chemistry 1: 121-128,2002. (Year: 2002).*
Kuboki et al.; "Lithium-air batteries using hydrophobic room temperature ionic liquid electrolyte"; Available online May 31, 2005; Journal of Power Sources 146 (2005) 766-769 (Year: 2005).*
Wang et al.; "Thermal, Electrochemical, and Spectroscopic Characterizations of Hyperbranched Polymer Electrolyte"; Journal of The Electrochemical Society, 146 (6) 2209-2215 (1999) (Year: 1999).*

(Continued)

*Primary Examiner* — Nathanael T Zemui
(74) *Attorney, Agent, or Firm* — Buchanan Ingersoll & Rooney P.C.

(57) ABSTRACT

The invention relates to an improved lithium-air battery. The battery includes a negative electrode and a positive electrode separated by an electrolyte, wherein the negative electrode consists of a film of metal material selected from among lithium and lithium alloys, the positive electrode includes a film of a porous carbon material on a current collector, and the electrolyte is a solution of lithium salts in a solvent. The battery is characterized in that the surface of the negative electrode opposite the electrolyte has a passivation layer containing $Li_2S$, $Li_2S_2O_4$, $Li_2O$, and $Li_2CO_3$, the passivation layer being richer in sulfur compound on the surface thereof that is in contact with the electrolyte. The battery is obtained by means of a method consisting of producing the positive electrode, the electrolyte, and a film of the metal material for forming the negative electrode, and assembling the positive electrode, the electrolyte, and the film of metal material. The method is characterized in that it includes a step of subjecting the film of metal material to a gaseous atmosphere containing $SO_2$, before or after the assembly thereof with the positive electrode and the electrolyte.

17 Claims, No Drawings

(56) References Cited

U.S. PATENT DOCUMENTS

| | | | |
|---|---|---|---|
| 2009/0104537 A1 | 4/2009 | Deschamps | |
| 2009/0123845 A1 | 5/2009 | Zaghig et al. | |
| 2009/0280410 A1* | 11/2009 | Zaguib | C23C 8/10 |
| | | | 429/220 |
| 2010/0104948 A1* | 4/2010 | Skotheim | H01M 4/02 |
| | | | 429/322 |
| 2010/0221614 A1* | 9/2010 | Bertin | C08F 293/005 |
| | | | 429/309 |
| 2010/0273066 A1 | 10/2010 | Flanagan et al. | |
| 2011/0129739 A1* | 6/2011 | Nakanishi | H01M 4/96 |
| | | | 429/405 |
| 2011/0165462 A1 | 7/2011 | Zhamu et al. | |
| 2011/0274983 A1* | 11/2011 | Yontz | H01M 10/052 |
| | | | 429/309 |
| 2012/0237838 A1* | 9/2012 | Uesaka | H01M 12/06 |
| | | | 429/405 |
| 2013/0143133 A1* | 6/2013 | Barde | H01M 4/381 |
| | | | 429/405 |

FOREIGN PATENT DOCUMENTS

| | | |
|---|---|---|
| JP | H1083836 A | 3/1998 |
| JP | 2003100309 A | 4/2003 |
| JP | 2004-206942 A | 7/2004 |
| JP | 2004-319489 A | 11/2004 |
| JP | 2005-116317 A | 4/2005 |
| JP | 2005-190880 A | 7/2005 |
| JP | 2008-516287 A | 5/2008 |
| JP | 2008-529209 A | 7/2008 |
| JP | 2009-506505 A | 2/2009 |
| JP | 2009-544121 A | 12/2009 |
| JP | WO 2010061451 A1 * | 6/2010 ............. H01M 4/96 |
| JP | 2010-177036 A | 8/2010 |
| JP | 2010-198798 A | 9/2010 |
| WO | 02/095849 A2 | 11/2002 |
| WO | 2008/009107 A2 | 1/2008 |
| WO | 2011/136186 A1 | 11/2011 |
| WO | WO-2012023019 A1 * | 2/2012 ............. H01M 12/08 |

OTHER PUBLICATIONS

International Search Report (PCT/ISA/210) issued on Feb. 22, 2012, by the Canadian Patent Office as the International Searching Authority for International Application No. PCT/CA2011/050737.

Written Opinion (PCT/ISA/237) issued on Feb. 22, 2012, by the Canadian Patent Office as the International Searching Authority for International Application No. PCT/CA2011/050737.

Takahito, et al."Polymer electrolytes based on hyperbranched polymers", Journal of Power Sources, Elsevier, vol. 97-98, pp. 637-640, 2001, XP28142878.

Joon-Ho, et al."Ionic liquids to the rescue? Overcoming the ionic conductivity limitations of polymer electrolytes" Electrochemistry Communications, vol. 5, pp. 1016-1020, 2003, XP008118459.

Search Report dated Jul. 7, 2016, by the European Patent Office in corresponding Application No. 11845009.7-1360/2647081. (10 pages).

Office Action (Notice of Reasons for Rejection) dated Nov. 1, 2016, by the Japanese Patent Office in Japanese Patent Application No. 2013-541162, and an English Translation of the Office Action. (15 pages).

Office Action (Notice of Reasons for Rejection) dated Nov. 4, 2015, by the Japanese Patent Office in corresponding Japanese Patent Application No. 2013-541162, and an English translation of the Office Action. (17 pages).

* cited by examiner

LITHIUM-AIR BATTERY

The present invention relates to a process for preparing a lithium-air battery, and to the battery obtained.

STATE OF THE ART

A "lithium-air" battery is a battery comprising a negative electrode and a positive electrode separated by an electrolyte. Each of the electrodes is in the form of a thin film. The negative electrode is generally constituted by a metal film chosen from lithium and lithium alloys. The positive electrode comprises porous carbon and optionally a catalyst. A "lithium-air" battery operates by reaction between the oxygen in the air (acting as an active substance for the positive electrode) and the lithium of the negative electrode. The electrolyte may be a solid-polymer electrolyte, a liquid electrolyte impregnating a separator or a ceramic. A lithium-air battery operates on the basis of the following reactions, which occur at the positive electrode:

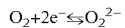

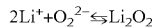

A lithium-air battery is therefore ideally suited to operate in an ambient medium, in contact with air.

During the first discharge of a lithium-air battery, the reactions at the positive electrode are $O_2 + 2\ e^- \rightarrow O_2^{2-}$ and $2\ Li^+ + O_2^{2-} \rightarrow Li_2O_2$, these reactions being favored by the presence of a catalyst (particularly $MnO_2$) in the electrode material. At the same time, the reaction at the negative electrode is $2Li \rightarrow 2Li^+ + 2\ e^-$.

When a lithium-air battery operates, a passivation layer forms at the surface of the negative electrode facing the film forming the electrolyte. This passivation layer is essentially constituted by $Li_2O$, $LiOH$ and $Li_2CO_3$. The favorable effect of this layer is to limit the formation of dendrites on the negative electrode, where dendrites may pierce the film forming the electrolyte. However, the thickness of this passivation layer increases during successive cycles, which results in a loss of battery capacity over time.

SUMMARY

An object of the present invention is to supply a lithium-air battery in which the loss of capacity is lower than in lithium-air batteries of the prior art, and a process for preparing said battery.

A battery according to the invention, called a lithium-air battery, comprises a negative electrode and a positive electrode separated by an electrolyte. The negative electrode is constituted by a film of metallic material chosen from lithium and lithium alloys. The positive electrode comprises a film of porous carbon material on a current collector and the electrolyte is a solution of a lithium salt in a solvent. It is characterized in that the surface of the negative electrode facing the electrolyte bears a passivation layer that essentially contains $Li_2S$ and/or $Li_2S_2O_4$ and optionally $Li_2O$ and $Li_2CO_3$, and the sulfur content increases in the thickness of said passivation layer, from the face in contact with the film of metallic material to the face in contact with the electrolyte.

The presence of S is observed by TEM analysis. The optional presence of $Li_2O$ and $Li_2CO_3$ is observed by XPS analysis.

The process of the present invention for preparing a battery comprising a negative electrode and a positive electrode separated by an electrolyte, in which the negative electrode is constituted by a film of metallic material chosen from lithium and lithium alloys, the positive electrode comprises a film of porous carbon material on a current collector and the electrolyte is a solution of a lithium salt in a solvent, consists in preparing the positive electrode, the electrolyte and a film of metallic material intended to form the negative electrode, and in assembling the positive electrode, the electrolyte and the film of metallic material. It is characterized in that it comprises a step consisting in subjecting the film of metallic material to a gaseous atmosphere containing $SO_2$.

DETAILED DESCRIPTION OF THE INVENTION

In a lithium-air battery according to the invention, a film of metallic material constituted by lithium or by a lithium alloy containing at least 90% by mass of lithium is used to prepare the negative electrode. The film of said metallic material preferably has a thickness between 10 and 500 μm. The lithium alloy may be for example a Li—Al, Li—Mg, Li—Al—Mg, Li—Zn, or Li—Si alloy, or a lithium nitride.

After treatment with $SO_2$, the lithium or lithium alloy film bears on its surface a passivation layer essentially containing $Li_2S$ and/or $Li_2S_2O_4$ and optionally $Li_2O$ and $Li_2CO_3$, and the sulfur content increases in the thickness of said passivation layer, from the face in contact with the film of metallic material to the face in contact with the electrolyte.

The treatment of the film of metallic material intended to form the negative electrode of a lithium-air battery according to the present invention is conducted by putting the film of metallic material in contact with a gaseous mixture containing $SO_2$. Said gaseous atmosphere essentially contains $SO_2$, the balance being constituted by an inert gas, specifically nitrogen. Preferably, the gaseous atmosphere that surrounds the film of metallic material to be treated contains at least 0.1 cm³ of $SO_2$ per cm² of surface area of metal (lithium or lithium alloy) to be treated, it being understood that the rate of reaction of $SO_2$ with lithium increases with the $SO_2$ content in said atmosphere. A content of 1 to 10 cm³ per cm² of metal is particularly advantageous.

The metallic material is treated with $SO_2$ at a temperature between 0° C. and 120° C. It is advantageously implemented at room temperature, specifically from 15° C. to 30° C.

The contact between the metallic material and the gaseous mixture containing $SO_2$ is maintained for long enough to obtain a passivation layer having a thickness of 1 nm to 1 μm. This duration essentially depends on the temperature at which the reaction is conducted, and on the $SO_2$ content of the gaseous mixture. It is within the reach of the person skilled in the art to determine the duration, when the $SO_2$ content and temperature are determined.

In a first embodiment, the film of metallic material intended to form the negative electrode of the lithium-air battery according to the invention is treated with $SO_2$ before being assembled with the other components of the battery. The film is then treated in an anhydrous enclosure, and the film obtained after the treatment must be stored and manipulated (in particular during battery assembly) in an anhydrous atmosphere.

In a second embodiment, the film of metallic material is treated with $SO_2$ after it is assembled with the positive electrode and the electrolyte. In this second embodiment, a film of metallic material, a film of electrolyte and the positive electrode are assembled, the assembly is placed in a pouch that comprises means for current input and output, and means to introduce a gaseous atmosphere, the pouch is sealed, and a gaseous mixture containing $SO_2$ is injected therein and maintained. Next, the means to introduce the gaseous mixture are disconnected and the pouch is sealed again.

The pouch can be a supple pouch called a "metal-plastic" pouch, constituted by a sheet comprising alternating plastic films and metallic films. For a battery called a "button cell", the pouch is a metal capsule that comprises first a base with perforations and united with the periphery forming the positive pole, and secondly a cover forming the negative pole.

According to a third embodiment, a continuous battery is developed from a film of metallic material, a film forming the electrolyte and a film forming the positive electrode, by making said films pass into a gaseous atmosphere containing $SO_2$ in the device in which they are assembled and at the entry to said device. The film of metallic material is thereby treated before and during its assembly with the film forming the positive electrode and the film forming the electrolyte. A process by co-rolling under a $SO_2$ atmosphere is particularly beneficial for assembling the constituent parts of the continuous battery. In this procedure, the film of metallic material is rolled to be brought to its final thickness, it is subject to a $SO_2$ atmosphere at the exit of the rolling mill, then it is co-rolled with the film forming the electrolyte and the film forming the positive electrode in a $SO_2$ atmosphere. When the metallic material intended to form the negative electrode is lithium, this procedure is particularly advantageous. Lithium is highly sensitive to oxygen, such that a "sharp" lithium film devoid of passivation layer is very difficult to obtain and preserve. A lithium film bears on its surface a passivation layer called a "natural" passivation layer essentially constituted by $Li_2O$, $Li_2CO_3$ and optionally LiOH, this passivation layer having harmful effects on the capacity of a battery in which the lithium film is used as negative electrode. Rolling a lithium film comprising a "natural" passivation layer has the effect of removing said passivation layer. When rolling is conducted in a $SO_2$ atmosphere, or when the rolled lithium film enters a $SO_2$ atmosphere immediately when exiting the rolling mill, sulfur compounds $Li_2S$ and $Li_2SO_4$ that stop or at the very least substantially limit the formation of $Li_2O$ or $Li_2CO_3$ form on the surface of the rolled lithium film. In all cases, the face of the passivation layer in contact with the lithium film is less rich in sulfur compounds than the face in contact with the electrolyte. A process consisting in assembling the negative electrode film, the electrolyte film and the positive electrode film by co-rolling under a $SO_2$ atmosphere is therefore particularly advantageous, in particular when the anode film is a lithium film.

In the various embodiments described above, the battery obtained is ready to operate.

The positive electrode of a lithium-air battery according to the present invention is constituted by a porous material deposited on a current collector, said porous material comprising carbon that has a high specific surface area, preferably greater than 10 $m^2/g$, more particularly greater than 1000 $m^2/g$. Specifically, carbon blacks sold as Ketjen Black® or Shawinigan® Black can be used.

The material of the positive electrode may further contain a polymer binder. The binder may be a solvating polymer chosen from polymers that can be used as electrolyte solvents, for example ethylene oxide homopolymers and ethylene oxide copolymers. The binder can also be a non-solvating polymer, for example a styrene butadiene copolymer, or a fluorinated polymer such as a polyfluorovinylidene (PVDF), a polyhexafluoropropylene (HPP), a PVDF-HFP copolymer, or a polytetrafluoroethylene (PTFE).

The porous material may also contain an electronic conductivity agent, which may be a carbon material having an electronic conductivity higher than that of the porous carbon used for the matrix of the positive electrode. This electronic conductivity agent may be chosen from natural or synthetic graphites, carbon nanotubes, carbon fibers, particularly fibers called VGCF®.

Preferably, when the porous material is prepared with a view to preparing the positive electrode, a compound that can catalyze the $O_2 \rightarrow O_2^{2-}$ reaction is added to the carbon. As an example of a catalyst, metal oxides can be cited, particularly $MnO_2$, $CoO_2$, $V_2O_5$, and metals, particularly Pd, Pt and Rh or mixtures thereof.

A material intended to form the positive electrode of a lithium-air battery comprises from 60 to 99% of a carbon material with a high specific surface area; from to 25% of a polymer binder; from 0 to 10% of an electronic conductivity agent. Said material further contains preferably from 0.1 to 10% of a catalyst.

The electrolyte of a lithium-air battery according to the present invention is constituted by a lithium salt in solution in a liquid solvent optionally gelled by the addition of a polymer, or in a polymer solvent, optionally plasticized.

The lithium salt used for the electrolyte may be chosen from among the lithium salts conventionally used in lithium batteries and batteries using lithium ions. As examples the following can be cited: lithium salts of an anion with delocalized charge, chosen from the group constituted by anions $Br^-$, $ClO_4^-$, and $AsF_6^-$, and anions corresponding to one of the formulas $R_FSO_3^-$, $(R_FSO_2)_2N^-$, $(R_FSO_2)_3C^-$, $C_6H_{(6-x)}(CO(CF_3SO_2)_2C^-)_x$ or $C_6H_{(6-x)}(SO_2(CF_3SO_2)_2C^-)_x$, in which $1 \leq x \leq 4$ and $R_F$ represents F, a perfluoroalkyl group preferably having from 1 to 5 carbon atoms or a perfluoroaryl group preferably having from 5 to 12 carbon atoms. Specifically $(FSO_2)_2N^-Li^+$, $(CF_3SO_2)_2N^-Li^+$, and $CF_3SO_3^-Li^+$ can be cited.

A liquid electrolyte is obtained by dissolving the lithium salt in a liquid solvent that may be a polar aprotic solvent or an ionic liquid. In this case, a porous separator impregnated by the liquid electrolyte is preferably used. In the conventional manner, the separator may be a polyethylene or polypropylene film.

The polar aprotic solvent may be chosen in particular from the group constituted by straight-chain ethers and cyclic ethers, esters, nitriles, nitrate derivatives, amides, sulfones, sulfolanes, alkylsulfamides and partially halogenated hydrocarbons. Particularly preferred solvents are diethyl ether, dimethoxyethane, glyme, tetrahydrofuran, dioxane, dimethyl-tetrahydrofuran, methyl or ethyl formate, propylene or ethylene carbonate, alkyl carbonates (in particular dimethyl carbonate, diethyl carbonate and methylpropyl carbonate), butyrolactones, acetonitrile, benzonitrile, nitromethane, nitrobenzene, dimethylformamide, diethylformamide, N-methylpyrrolidone, dimethyl sulfone, tetramethylene sulfone and tetraalkylsulfonamides having from 5 to 10 carbon atoms.

The liquid solvent may be constituted by an ionic liquid. Ionic liquid is understood to be a compound that only contains anions and cations that compensate their charges, and that is liquid at the operating temperature of the battery. In particular salts that have the following can be cited:

an ammonium, phosphonium, sulfonium, iodonium, pyridinium, pyrazolium, acetamidinium, oxazolium, thiazolium, pyrrolodinium, piperidinium, imidazolium, or guanidinium cation, and an anion chosen from Cl, Br, I, $N(CN)_2^-$, $C(CN)_3^-$, $[(C_2O_4)_2B^-]$ anions, sulfonate, sulfinate, phosphinate, or phosphonate anions bearing at least one alkyl or perfluoroalkyl group, $BF_4^-$ and $PF_6^-$ anions in which at least one of the F atoms is optionally replaced by a fluoroalkyl group, fluoroalkyl carbonate, fluoroalkylsulfonate, bis(fluorosulfonyl)imide, bis(trifluoroalkylsulfonyl)imide, bis(trifluoroalkylsulfonyl)methide, tris(trifluoroalkylsulfonyl)methide, and anions derived from perfluoroalkylmalononitrile.

Hydrophobic ionic liquids are particularly preferred. As examples, the following compounds can be cited:

1-ethyl-3-methylimidazolium bis-(trifluoromethane-sulfonyl)imide (EMI-TFSI);

pyridinium fluorosulfonylimide;

N-butyl-N-methylpyrrolidinium bis(fluorosulfonyl)imide ($PYR_{14}FSI$);

N-propyl-N-methylpyrrolidinium bis(fluorosulfonyl)imide ($PYR_{13}FSI$);

N-butyl-N-methylpyrrolidinium bis(trifluoro-methanesulfonyl)imide ($PYR_{14}TFSI$);

N-propyl-N-methylpyrrolidinium bis(trifluoro-methanesulfonyl)imide ($PYR_{13}TFSI$);

1-octylpyridinium bis(trifluoromethanesulfonyl)imide $[OPYR]^+$-$TFSI^-$;

1-octyl-2-methylpyridinium bis(trifluoro-methanesulfonyl)imide $[2MOPYR]^+$-$TFSI^-$;

1-octyl-4-methylpyridinium bis(trifluoro-methanesulfonyl)imide $[4MOPYR]^+$-$TFSI^-$.

The liquid electrolyte is preferably a solution in which the lithium salt content is from 0.1 to 2.5 mol/L.

A polymer electrolyte may be obtained by dissolving the lithium salt in a solvating polymer.

The solvating polymer may be a polymer that is cross-linked or not, bearing grafted ionic groups or not. A solvating polymer is a polymer that includes recurrent solvating units containing at least one heteroatom chosen from sulfur, oxygen, nitrogen and fluorine. As examples of solvating polymers, the following can be cited: polyethers with straight-chain, comb or block structures, forming a network or not, based on polyethylene oxide, or copolymers containing the ethylene oxide or propylene oxide or allyl glycidyl ether unit, polyphosphazenes, crosslinked networks based on polyethylene glycol crosslinked by isocyanates or networks obtained by polycondensation and bearing groups that allow the incorporation of groups that can be crosslinked. Block copolymers in which some blocks bear functions that have redox properties can also be cited. Of course, the list above is not limiting, and all polymers having solvating properties may be used. Polyethers are particularly preferred.

In a polymer electrolyte, the proportion of lithium salt is chosen preferably such that the "solvating unit/Li atom" molar ratio is between 10 and 40, it being understood that "solvating unit" designates the recurrent solvating unit containing at least one heteroatom chosen from sulfur, oxygen, nitrogen and fluorine, as defined previously. When the solvating polymer is a polyethylene oxide, the O/Li molar ratio is preferably between 10 and 40.

The presence of a solvating polymer in the electrolyte significantly limits the reaction of the lithium of the anode with water (i.e. LiOH formation), which would come for example from the atmosphere that surrounds the lithium-air battery and that supplies the oxygen necessary for its operation.

The polymer may optionally be plasticized by addition of a liquid solvent, chosen from those that may be used for preparing a liquid electrolyte. When the polymer electrolyte contains a liquid solvent acting as a plasticizer, the liquid solvent content is preferably less than 10% by mass.

The presence of a hydrophobic ionic liquid in the electrolyte of a lithium battery, as principal solvent or as plasticizer for a polymer solvent, stops water from contacting the metallic lithium. The polymer/ionic liquid combination prevents the transformation of metallic lithium into LiOH, $Li_2O$ or $Li_2CO_3$. This property translates to a substantial reduction in initial impedance, an increase in initial capacity and capacity conservation during cycling, independent of the fact that the battery operates in a dry air atmosphere or in a moist air atmosphere.

The solvent of the electrolyte may further be constituted by a mixture of an aprotic liquid solvent chosen from the aprotic liquid solvents cited above and a polar polymer comprising units containing at least one heteroatom chosen from sulfur, nitrogen, oxygen and fluorine. As an example of such a polar polymer, polymers that principally contain units derived from acrylonitrile, vinylidene fluoride, N-vinylpyrrolidone or methyl methacrylate can be cited. The proportion of aprotic liquid in the solvent may vary from 1% (corresponding to a plasticized polymer) to 99% (corresponding to a gelled liquid).

A polymer electrolyte gel is constituted preferably by at least 75% by mass of a solution of a lithium salt in a liquid solvent and at most 25% by mass of polymer, and the salt solution in the liquid solvent has a salt content between 0.1 M and 2.5 M/L.

In a preferred embodiment, the electrolyte of the battery according to the invention is a solid solution of a lithium salt in a solvating polymer. Polyethers with 3 or 4 branches are particularly preferred solvating polymers. The molar mass of the polymer is not critical. Preferably, a polymer having a molar mass between 1000 and $10^6$ is chosen, for example about 10000.

The presence of an ionic liquid in an electrolyte whose solvent is a solvating polymer reduces the total impedance, increases the initial capacity and maintains the capacity during battery operation in an air atmosphere. The addition of a hydrophobic ionic liquid increases the initial capacity and maintains it during operation, even in the presence of moist air.

The addition of inorganic oxides to the polymer electrolyte improves the mechanical properties of the electrolyte and its ionic conductivity, particularly when the oxide content is less than 10% by mass. The addition of oxides has no negative effect on impedance or capacity.

The electrolyte of a lithium-air battery according to the invention may further be constituted by a ceramic, for example NaSiCoN, LiSiCoN, ($Li_2S$—$P_2S_5$), $Li_2P_3O_{12}$ or ($Li_{1.5}Al_{0.5}Ge_{1.5}$ $(PO_4)_{3-0.05}Li_2O$).

When the electrolyte is a ceramic, or when the solvent of the electrolyte is a dry polymer, it is preferable to subject the battery to a first cycling, during which the passivation film stabilizes.

EXAMPLES

The present invention is illustrated in greater detail using the examples that follow, to which it is not however limited.

Example 1

Treatment of Lithium with $SO_2$

A lithium film having a thickness of 38 μm is prepared by rolling a 250-μm lithium film supplied by FMC Corporation (USA).

A 3-cm$^2$ sample was then taken from the lithium film obtained by rolling and it was placed into a "metal-plastic" pouch that was then sealed under vacuum. Using a syringe, 10 cm$^3$ of $SO_2$ was introduced into the sealed pouch and it was left in contact for one hour. The "metal-plastic" pouch was then placed in a glove box in a helium atmosphere, the lithium film was extracted therefrom and assembled with an electrolyte as follows:

Lithium/Electrolyte/Lithium

The electrolyte used is a 1M $LiPF_6$ solution in a 50/50 mixture by volume of ethyl carbonate (EC) and diethyl carbonate (DEC).

Impedance was measured intermittently for a duration of 256 h after assembly. The total impedance (which results from the ohmic resistance, the interface resistance and the diffusional resistance) is 1000Ω. Another sample of the lithium film obtained by rolling was subjected to the same treatment with $SO_2$. XPS analysis of the sample treated with $SO_2$ shows that the lithium film bears a passivation layer comprising $Li_2O$ and $Li_2CO_3$. The presence of $Li_2S$ and $Li_2S_2O_4$ in the passivation layer is shown by TEM analysis.

Example 2 (Comparison)

Treatment of Lithium with Air Having a Humidity Level of 55%

The procedure from example 1 was reproduced but with an injection of 10 cm$^3$ of air having a humidity level of 55% into the "metal-plastic" pouch, instead of 10 cm$^3$ of $SO_2$.

The total impedance, measured in the same way as in example 1, is 4000Ω, i.e. four times higher than that of the sample treated with $SO_2$. This high value is due to the reaction between Li and the humidity of the air, which forms LiOH and $Li_2O$.

Examples 3-10

Use of a Lithium Film as Anode of a Lithium Battery

Several "button cell" type batteries have been prepared by assembling the following components in a metal capsule that comprises a base with perforations and united with the periphery forming the positive pole and a cover forming the negative pole. The negative electrodes for the different batteries are identical, as are the positive electrodes.

The negative electrode is a lithium film having a surface area of 3 cm$^2$, sampled from a lithium film treated according to example 1.

The positive electrode is a film of a composite material having a thickness of 50 μm deposited on an aluminum grid having a thickness of 20 μm serving as current collector, said composite material being constituted by a mixture of $MnO_2$, carbon and PVDF as binder in a ratio of 10/70/20 by weight.

The electrolyte of each battery is a solution of a lithium salt in a solvent. Different electrolytes have been used. To prepare the electrolytes, the following compounds were used:

$(FSO_2)_2N^-Li^+$ (LiFSI) or $(CF_3SO_2)_2N^-Li^+$ (LiTFSI) as lithium salt;

a 50/50 ethyl carbonate (EC)/diethyl carbonate (DEC) mixture as liquid solvent, impregnating a polypropylene separator;

a polyether with 4 branches (PE4) having a molar mass of 10000;

N-propyl-N-methylpyrrolidinium bis(fluorosulfonyl) imide ($PYR_{13}FSI$) as ionic liquid.

In examples 3 to 4, the electrolyte is a 0.5M LiFSI solution in a mixture comprising 10 parts by weight of PE4 polymer and 90 parts by weight of ionic liquid $PYR_{13}FSI$ containing 0.5M/L LiFSI.

In example 5, the electrolyte is a 1M $LiPF_6$ solution in 50/50 EC/DEC.

In examples 6 and 7, the electrolyte is a solid LiTFSI solution in a PE4 polymer, with an O/Li ratio of 20/1, Li being the number of Li atoms provided by LiTFSI and O the number of oxygen atoms in the polyether.

In example 8, the electrolyte is a LiTFSI solution in a PE4 polymer, with an O/Li ratio of 20/1, further containing $TiO_2$, $Al_2O_3$ and $SO_2$, each of the oxides representing 5% by weight with respect to the total weight of the electrolyte.

In examples 9 and 10, the electrolyte is a 0.5M LiFSI solution in a mixture comprising 10 parts by weight of PE4 polymer and 90 parts by weight of ionic liquid $PYR_{13}FSI$ containing 0.5M/L LiFSI, further containing $TiO_2$, $Al_2O_3$ and $SiO_2$, each of the oxides representing 5% by weight with respect to the total weight of the electrolyte.

The base of the capsule comprises perforations so that oxygen in air, which participates in the reaction on the basis of which the battery operates, can enter the battery. The assembled button cell is placed in a sealed container whose cover has devices for gas input and output, and has devices for the passage of electrical conduits connected to the button cell.

For each of the batteries, a gas was then injected into the container and the impedance was measured intermittently for 256 hours.

After stabilization, each of the batteries was charged and discharged between 2 V and 4 V with a current of 0.1 mA/cm$^2$, and the reversible capacity $C_0$ and the residual reversible capacity $C_5$ after 5 cycles were determined, both expressed in mAh/g of carbon.

The measurements were taken in different atmospheres in the button cells. The following table gives the specific characteristics of the various button cells (constitution of the electrolyte and atmosphere in the capsule), and the total impedance $I_T$ (in ohms), the initial reversible capacity $C_0$, and the reversible capacity $C_5$ after the fifth cycle (in mAh/g of carbon).

| Ex. | Electrolyte | Atmosphere | $I_T$ | $C_0$ | $C_5$ |
|---|---|---|---|---|---|
| 3 | 0.5M LiFSI solution in a polymer solvent constituted by Py13-FSI + 10 polymer 4 branches | Dry air | 650 | 3700 | 3650 |
| 4 | 0.5M LiFSI solution in a polymer solvent constituted by Py13-FSI + 10 polymer 4 branches | Air at 55% humidity | 645 | 3750 | 3675 |
| 5 | 1M $LiPF_6$ solution in 50/50 EC/DEC | Air at 55% humidity | 2907 | 1905 | 450 |
| 6 | LiTFSI + polyether 4 branches, O/Li = 20/1 | Dry air | 1200 | 2550 | 2500 |
| 7 | LiTFSI + polyether 4 branches, O/Li = 20/1 | Air at 55% humidity | 2200 | 1800 | 390 |

-continued

| Ex. | Electrolyte | Atmosphere | $I_T$ | $C_0$ | $C_5$ |
|---|---|---|---|---|---|
| 8 | LiTFSI + polyether 4 branches, O/Li = 20/1 + 5% $TiO_2$ + 5% $Al_2O_3$ + 5% $SiO_2$ | Dry air | 1100 | 2590 | 2580 |
| 9 | 0.5M LiFSI solution in a polymer solvent constituted by Py13-FSI + 10 polymer 4 branches + 5% $TiO_2$ + 5% $Al_2O_3$ + 5% $SiO_2$ | Dry air | 625 | 3900 | 3850 |
| 10 | 0.5M LiFSI solution in a polymer solvent constituted by Py13-FSI + 10 polymer 4 branches + 5% $TiO_2$ + 5% $Al_2O_3$ + 5% $SiO_2$ | Air at 55% humidity | 650 | 3851 | 3825 |

Comparing the results in examples 3 to 4 shows that, in a battery according to the invention in which the electrolyte contains a hydrophobic ionic liquid, the initial reversible capacity is high and stable during operation comprising a succession of discharge-charge cycles (cycling), in a dry or moist atmosphere.

Electrochemical performances are lower in example 5 because of the presence of water in the atmosphere in which the button cell is found and because the electrolyte does not contain a polymer that would stop or at the very least limit the reaction of lithium with water to form LiOH, $Li_2O$ or $Li_2CO_3$.

Comparing the results of cycling in moist air (examples 4, 5, 7 and 10) shows that a liquid electrolyte or a polymer electrolyte not containing an ionic liquid gives lower initial capacity that in addition reduces greatly during cycling.

Comparing the results of cycling in dry air (examples 3, 8 and 9) shows that a polymer electrolyte gives the button cell of the invention stability during cycling, the initial capacity being higher when the polymer electrolyte contains an "ionic liquid" compound.

The invention claimed is:

1. A lithium-air battery comprising a negative electrode and a positive electrode separated by an electrolyte, in which the positive electrode is constituted by a porous carbon material comprising 60 to 99 wt % of carbon on a current collector, and the negative electrode is constituted by a film of a metallic material chosen from lithium and lithium alloys, wherein the surface of the negative electrode facing the electrolyte bears a passivation layer comprising $Li_2S$ and $Li_2S_2O_4$, and the sulfur content increases in the thickness of said passivation layer, from the face in contact with the film of metallic material to the face in contact with the electrolyte,
   wherein the passivation layer is formed by contacting the film of metallic material with a gaseous mixture consisting essentially of $SO_2$ and, optionally, an inert gas,
   wherein the electrolyte consists essentially of a solid solution, wherein the solid solution is obtained by mixing a lithium salt in a solvating polymer comprising a hydrophobic ionic liquid, wherein the solvating polymer is a polyether based on polyethylene oxide and the polyether has 3 or 4 branches attached thereto and wherein a solvating unit to Li ion molar ratio is between 10 and 40, and
   wherein the porous carbon material has a specific surface area greater than 10 $m^2/g$.

2. The lithium-air battery as claimed in claim 1, wherein the porous carbon material further contains a polymer binder, an electronic conductivity agent, or both.

3. The lithium-air battery as claimed in claim 1, wherein the porous carbon material contains at least one catalyst selected from the group consisting of $MnO_2$, $CoO_2$, $V_2O_5$, Pd, Pt and Rh.

4. The lithium-air battery as claimed in claim 1, wherein the electrolyte further contains at least one inorganic oxide.

5. The lithium-air battery as claimed in claim 1, wherein the ionic liquid is a hydrophobic ionic liquid selected from the group consisting of 1-ethyl-3-methylimidazolium bis(trifluoro-methanesulfonyl)imide; pyridinium fluorosulfonylimide; N-butyl-N-methylpyrrolidinium bis(fluoro-sulfonyl)imide; N-propyl-N-methylpyrrolidinium bis(fluorosulfonyl) imide; N-butyl-N-methylpyrrolidiniumbis(trifluoromethanesulfonyl)imide; N-propyl-N-methyl-pyrrolidinium bis(trifluoro-methanesulfonyl)imide; 1-octylpyridinium bis(trifluoromethanesulfonyl)-imide; 1-octyl-2-methyl-pyridiniumbis(trifluoromethanesulfonyl) imide; 1-octyl-4-methylpyridinium bis(trifluoromethanesulfonyl)imide.

6. The lithium-air battery as claimed in claim 1, wherein the porous carbon material is a film.

7. The lithium-air battery as claimed in claim 1, wherein the positive electrode further comprises up to 25 wt % of a polymer binder, up to 10% of an electronic conductivity agent, and optionally up to 10% of a catalyst.

8. The lithium-air battery as claimed in claim 1, comprising a metal capsule having a base with perforations forming a positive pole.

9. The lithium-air battery as claimed in claim 1, comprising a cover forming a negative pole.

10. The lithium-air battery as claimed in claim 1, comprising a sealed container having a cover with devices for gas input and output.

11. The lithium-air battery as claimed in claim 1, comprising devices for passage of electrical conduits.

12. The lithium-air battery as claimed in claim 1, wherein the porous carbon material has a specific surface area greater than 1000 $m^2/g$.

13. The lithium-air battery as claimed in claim 1, wherein the inert gas is nitrogen.

14. The lithium-air battery as claimed in claim 1, wherein the electrolyte does not comprise porous organic particles.

15. A lithium-air battery comprising a negative electrode and a positive electrode separated by an electrolyte, in which the positive electrode is constituted by a porous carbon material comprising 60 to 99 wt % of carbon on a current collector, and the negative electrode is constituted by a film of a metallic material chosen from lithium and lithium alloys, wherein the surface of the negative electrode facing the electrolyte bears a passivation layer comprising $Li_2S$ and $Li_2S_2O_4$, and the sulfur content increases in the thickness of said passivation layer, from the face in contact with the film of metallic material to the face in contact with the electrolyte,
   wherein the passivation layer is formed by contacting the film of metallic material with a gaseous mixture consisting essentially of $SO_2$ and, optionally, an inert gas,
   wherein the electrolyte consists of a solid solution, wherein the solid solution is obtained by mixing a lithium salt in a solvating polymer comprising a hydrophobic ionic liquid, wherein the solvating polymer is a polyether based on polyethylene oxide and the polyether has 3 or 4 branches attached thereto and wherein a solvating unit to Li ion molar ratio is between 10 and 40, and optionally at least one inorganic oxide, and wherein the porous carbon material has a specific surface area greater than 10 m$^2$/g.

16. The lithium-air battery as claimed in claim 1, wherein the solvating polymer is crosslinked.

17. The lithium-air battery as claimed in claim 15, wherein the solvating polymer is crosslinked.

* * * * *